United States Patent
Hopton et al.

(10) Patent No.: US 9,372,674 B2
(45) Date of Patent: Jun. 21, 2016

(54) DYNAMIC GENERATION OF USER INTERFACE PLACEHOLDER TEMPLATES

(71) Applicant: MICROSOFT TECHNOLOGY LICENSING, LLC, Redmond, WA (US)

(72) Inventors: Dominic Hopton, Redmond, WA (US); Mark Leece, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 526 days.

(21) Appl. No.: 13/797,083

(22) Filed: Mar. 12, 2013

(65) Prior Publication Data

US 2014/0282138 A1    Sep. 18, 2014

(51) Int. Cl.
  *G06F 3/0482* (2013.01)
  *G06F 9/44* (2006.01)

(52) U.S. Cl.
  CPC .............. *G06F 8/38* (2013.01); *G06F 9/4443* (2013.01)

(58) Field of Classification Search
  CPC ......... G06F 3/00; G06F 3/048; G06F 3/0481; G06F 3/0482; G06F 3/04817; G06F 9/4443; H04L 29/06; H04L 29/0809; H04L 41/22; H04L 4/18; H04W 4/00
  See application file for complete search history.

(56) References Cited

U.S. PATENT DOCUMENTS

| | | | |
|---|---|---|---|
| 7,620,890 B2 | 11/2009 | Dietl et al. | |
| 7,941,340 B2 | 5/2011 | Doemling et al. | |
| 8,799,829 B2 * | 8/2014 | Grosz et al. | 715/866 |
| 9,043,441 B1 * | 5/2015 | Cheng | G06F 17/30 709/219 |
| 2007/0180020 A1 | 8/2007 | Woods | |
| 2008/0178125 A1 | 7/2008 | Elsbree et al. | |
| 2008/0215979 A1 | 9/2008 | Clifton et al. | |
| 2009/0030944 A1 | 1/2009 | Ni et al. | |
| 2010/0281402 A1 | 11/2010 | Staikos et al. | |
| 2011/0197126 A1 | 8/2011 | Arastafar | |
| 2012/0079126 A1 * | 3/2012 | Evans | G06F 9/4443 709/230 |
| 2012/0303697 A1 | 11/2012 | Alstad | |
| 2013/0007587 A1 * | 1/2013 | Marantz et al. | 715/234 |
| 2013/0124980 A1 * | 5/2013 | Hudson et al. | 715/243 |

OTHER PUBLICATIONS

Kavaldjian, et al., "Semi-automatic user interface generation considering pointing granularity", Retrieved at <<http://ieeexplore.ieee.org/stamp/stamp.jsp?tp=&arnumber=5346356>>, In IEEE International Conference on Systems, Man and Cybernetics, Oct. 11, 2009, pp. 7.

* cited by examiner

*Primary Examiner* — Xiomar L Bautista
(74) *Attorney, Agent, or Firm* — Bryan Webster; Judy Yee; Micky Minhas

(57) ABSTRACT

Embodiments are disclosed that relate to dynamically generating a preview placeholder template for presenting data in a user interface. For example, one disclosed embodiment provides a method comprising receiving a request to display a list of items, each item of the list of items comprising a plurality of parts each having a full appearance defined by a corresponding portion of a full version template. The method further comprises, for an item in the list of items, rendering a full version of a representation of the item, and generating via the full version template a preview placeholder template defining an appearance of a thin version of a list item representation comprising a subset of the plurality of parts. The method further comprises storing the preview placeholder template, and retrieving the preview placeholder template from storage and rendering a thin version of each of one or more list items.

20 Claims, 6 Drawing Sheets

FIG. 1B

DYNAMIC GENERATION OF USER INTERFACE PLACEHOLDER TEMPLATES

BACKGROUND

Various user interfaces displayed on a computing device user interface, such as lists of items, may include multiple fields of information for each item, and the speed at which information for each field may be obtained and/or rendered may vary. Thus, to avoid delay in rendering such user interfaces, some user interfaces may allow items to be initially displayed in a "thin" preview version that may be rapidly rendered for display, followed by a "full" version of the item once rendering of the full version has been completed. For such user interfaces, separate thin and full versions of the item representations may be designed and maintained for each item in the data set used to produce the user interface. As such, the thin version may require updating when changes are made to the full version to ensure that the thin and full versions maintain a consistent appearance.

SUMMARY

Embodiments are disclosed herein that relate to dynamically generating a preview placeholder template for presenting data in a user interface. For example, one disclosed embodiment provides a method comprising receiving a request to display a list of items, each item of the list of items comprising a plurality of parts each having an appearance defined by a corresponding portion of a full version template. The method further comprises, for an item in the list of items, rendering a full version of a representation of the item, and generating via the full version template a preview placeholder template defining an appearance of a thin version of a list item representation comprising a subset of the plurality of parts. The method further comprises storing the preview placeholder template, and, in a later request to display the list of items, retrieving the preview placeholder template from storage and rendering a thin version via the preview placeholder template.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1B shows the user interface of FIG. 1A after cessation of scrolling in accordance with an embodiment of the present disclosure.

DETAILED DESCRIPTION

As mentioned above, a list of items displayed on a computing device user interface may include multiple fields of information for each item. The appearance of each item may be defined by a template that specifies an appearance of a full representation for the list items. This template also may be referred to herein as a full version template.

The speed at which information for each field may be obtained and/or rendered may vary. For example, a list of songs stored on a computing device may include, for each song, data fields such as title, artist, album, genre, and the like. Further, some fields, such as album artwork, may comprise graphical elements. While browsing such a list, such as by scrolling through the list on a computing device display, a user may view list representations of a large number of songs. Where a full version of each list item is rendered during browsing, the collective effort of retrieving and rendering multiple pieces of associated data for each song may result in detectable user interface rendering delays.

Thus, in order to address such delays, some systems may utilize a thin "placeholder" template that defines a more rapidly renderable list item than the full version template, such that the thin template may be initially used to render a thin "placeholder" version of a list item prior to replacing the thin version with a full representation version. However, this dual structure may provide an additional burden for developers of the user interface, as a developer has a burden of ensuring that changes made to the full representation template are also made in the thin representation template to keep the appearances of the full and thin representations consistent.

Thus, embodiments are disclosed that relate to dynamically generating a thin representation template for a user interface item via a full version template. The thin version template also may be referred to herein as a preview placeholder template. By dynamically generating a preview placeholder template from a full version template, separate maintenance of the preview placeholder template may be avoided. Further, after generation, the preview placeholder template may be stored for later retrieval.

Figure 1A:
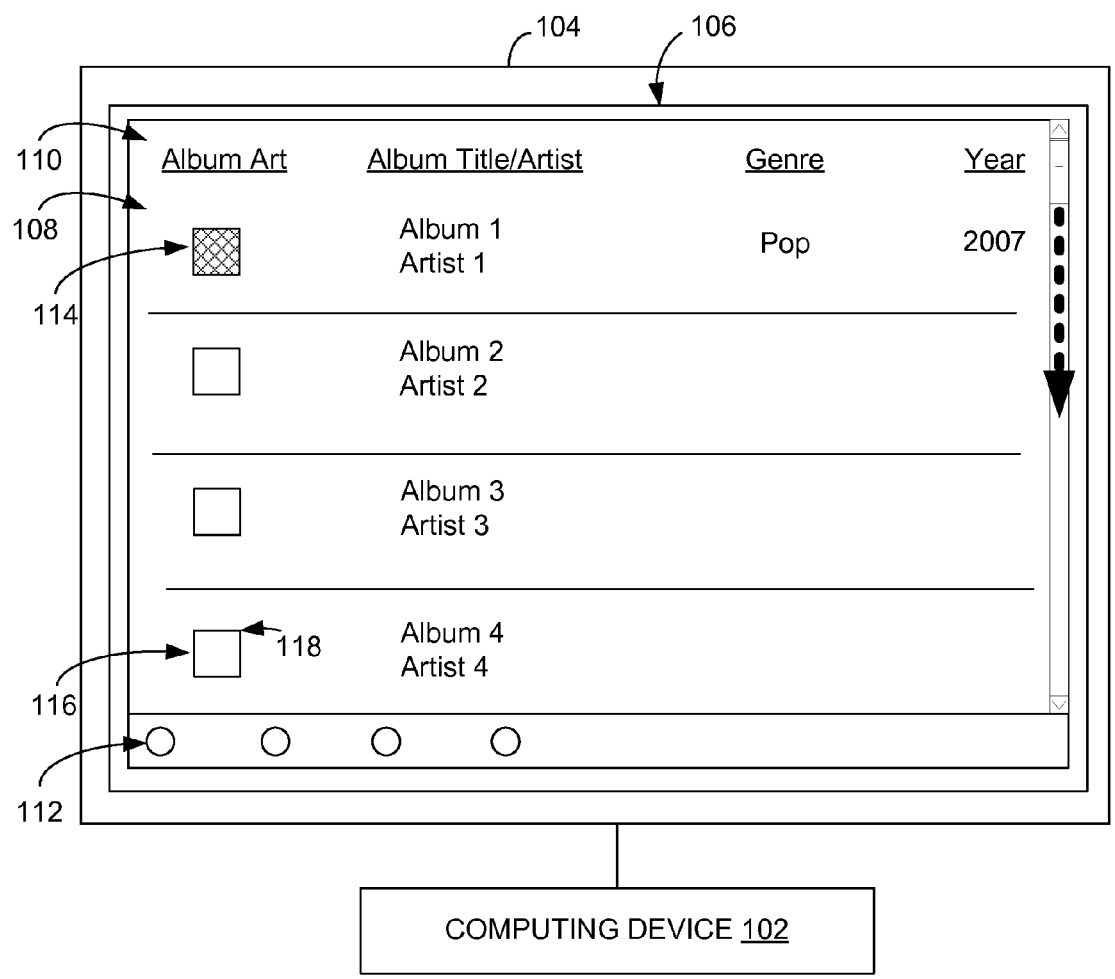
FIG. 1A schematically shows a computing device and a display device displaying a list user interface during scrolling in accordance with an embodiment of the present disclosure.

FIG. 1A shows a computing device 102 communicatively connected to a display device 104 for presenting a user interface 106. The display device 104 may represent any suitable display device, including but not limited to a computer monitor, a television, a display for a mobile device (e.g., a tablet, a smartphone, a mobile communication device, etc.), or other display device. It will be understood that the computing device 102 and display device 104 may be integrated into a single device or may be housed separately and communicatively connected.

In the depicted embodiment, the user interface 106 corresponds to a graphical user interface for an entertainment media application, but it will be understood that the user interface 106 may display any suitable data in any suitable form. The user interface 106 comprises a list of items 108 in the form of a list of media content items. Each item includes various fields of metadata, including but not limited to album art, album title and artist, genre, and year. The user interface 106 also may include items other than the list of items 108, such as header items 110 and playback controls 112.

As mentioned above, a user may browse the list of items 108 by scrolling through the user interface 106. In the example illustrated in FIG. 1A, a view of user interface 106 at a selected point in time during a downward scrolling action is presented. As shown, a full version 114 of a representation of a first item, Album 1, is presented in the user interface 106. In the depicted full version, each available field of metadata is rendered and displayed. Additionally, thin versions 116 of representations of the remaining items, Albums 2 through 4, in the list of items 108 are depicted. The thin versions 116 may omit parts of the item, such as particular fields of the metadata, present alternate versions of parts of the item, and/or have any other suitable appearance relative to the full versions of the list item representations.

Where an item or items of a full version is omitted, a default item may be presented in its place, where the default item comprises one or more appearance features from the full version template for the omitted item (e.g. size, location, etc.). For example, as shown for album 2 in the list of items 108, a box is displayed in the place of an image representing album art for the album as a default item. The box may have the same size and/or position as fully rendered album art for album 2, but may omit an image of the album art, for example.

The appearance features may include any suitable feature(s) and parameter(s) for the feature(s) relating to the appearance of a part of an item, including but not limited to characteristics of position, size, font, color, style, etc. For example, the thin version 116 of the representation of Album 4 may include the text "Album 4" having a same font size, style, and position as specified for the full version but omit the actual album art, as illustrated by the presentation of a placeholder 118. Further, information regarding genre and year is not shown in the thin version.

Figure 1B:
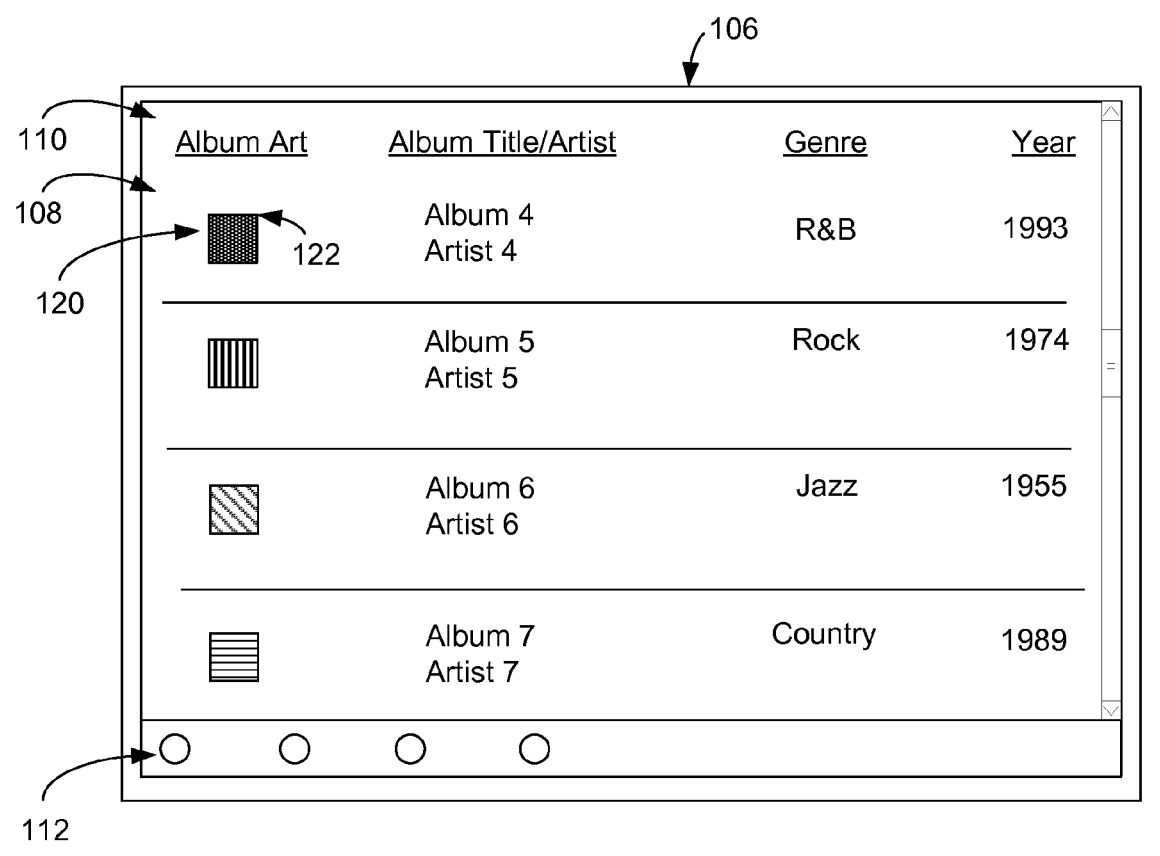

FIG. 1B shows the user interface 106 of FIG. 1A at a later point in time, after scrolling has ceased and/or slowed. Accordingly, enough time may have passed to allow a full version of a representation of each of the items in the list of items 108 to be rendered in place of the thin version. Thus, in comparison to the thin version 116 illustrated in FIG. 1A, the full version 120 includes a presentation of information for genre and year, as well as an album art image 122, for each displayed item. As the image 122 for album art in the full version 120 is positioned in the same relative position and has the same size as the placeholder 118 for album art in the thin version 116, the replacement of the thin version 116 with the full version 120 may be more fluid and less jarring than with generic thin representations having less contextual overlap with the corresponding full version. Further, as the thin version template is generated from the full version template, the similar appearances may be maintained with less effort than where the thin and full version templates are separately maintained.

Figure 2:
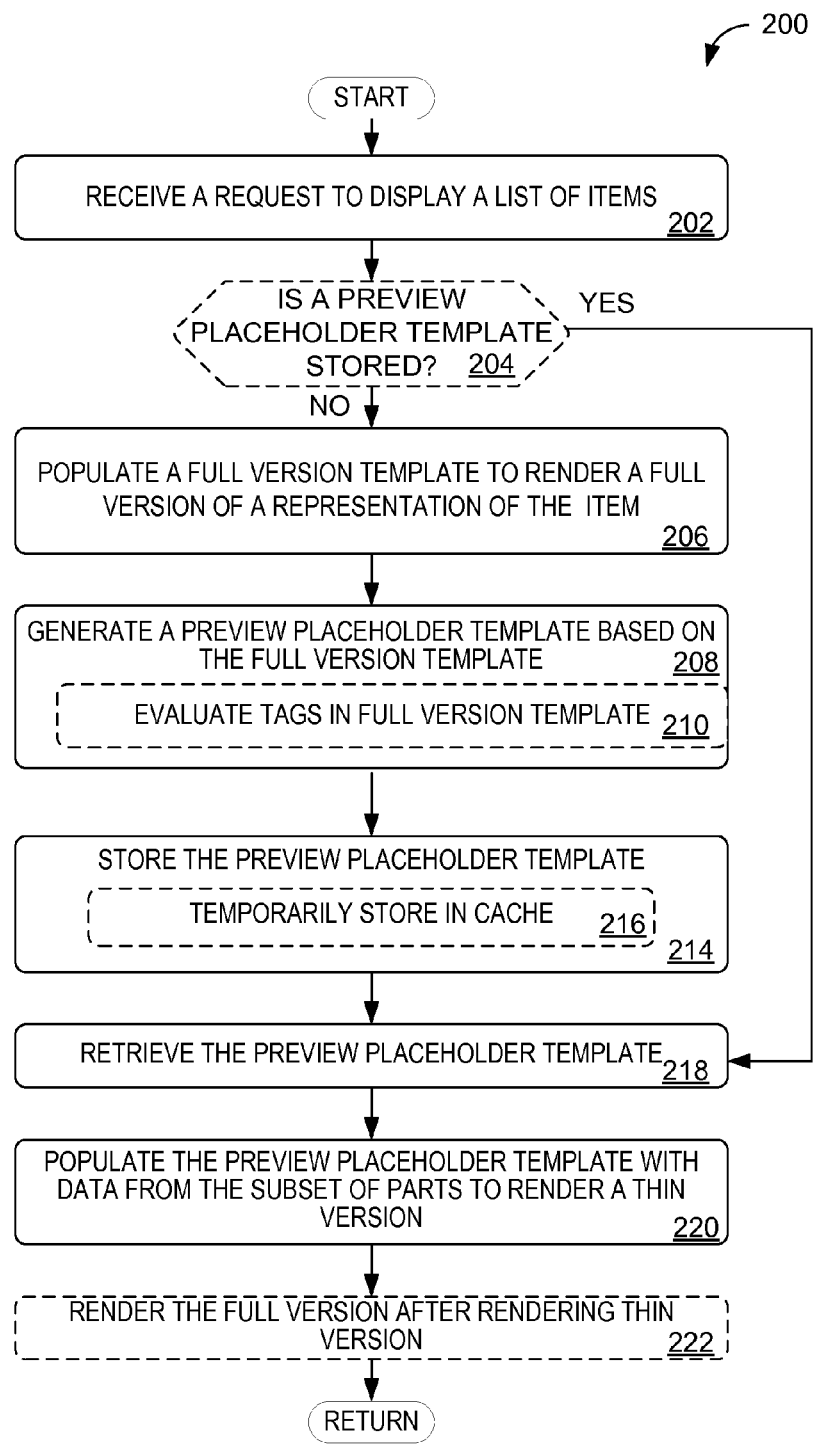
FIG. 2 shows a flow diagram depicting a method of dynamically generating a preview placeholder template in accordance with an embodiment of the present disclosure.

FIG. 2 shows a method 200 of presenting a user interface in accordance with an embodiment of the present disclosure. It will be understood that method 200 may be performed via any suitable computing device. At 202, method 200 includes receiving a request to display a list of items. Each item of the list of items may include a plurality of parts, and each part may have an appearance defined by a corresponding portion of a template that defines an appearance of a full version of the list item.

Figure 3:
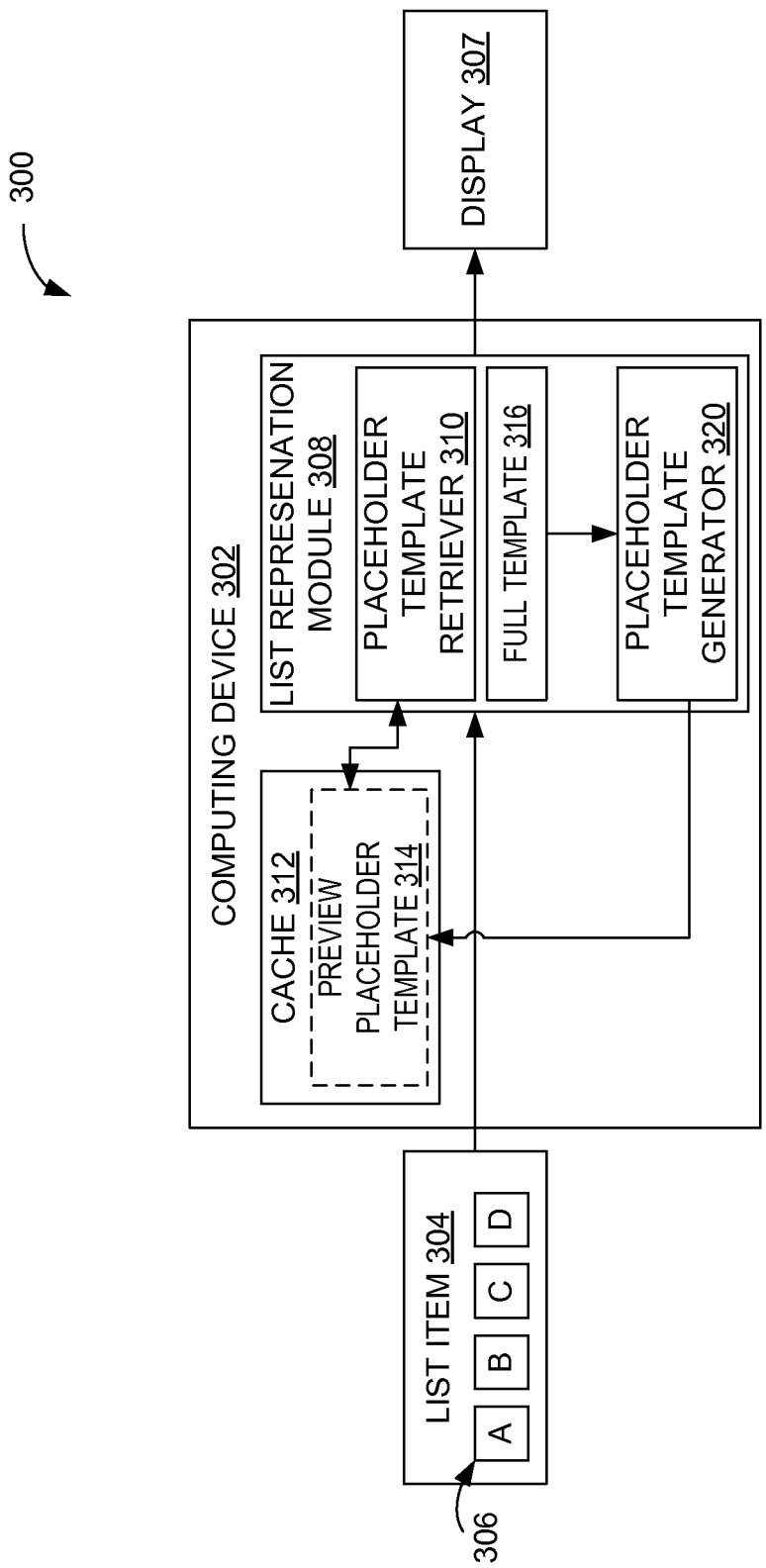
FIG. 3 shows a block diagram of a system for dynamically generating a preview placeholder template in accordance with an embodiment of the present disclosure.

At 204, method 200 includes determining if a preview placeholder template has been previously stored. One example of storing of a preview placeholder template is shown in FIG. 3, which illustrates a block diagram of a system 300 for dynamically generating preview placeholder templates. System 300 includes a computing device 302 that receives a list item 304 having a plurality of parts 306, illustrated schematically as parts A, B, C, and D for display on a display 307. For example, the list item 304 may be a song, and the parts 306 may correspond to different fields of metadata for that song (e.g., song title, album title, artist, album art, duration, genre, year, etc.).

Upon receipt, the list item 304 may be passed to a list representation module 308 for processing the list item 304. The list representation module 308 may include a preview placeholder template retriever module 310, which may be called to determine whether a preview placeholder template for the full version template for list item 304 has been previously generated and stored. In some embodiments, a memory cache 312 may be used to temporarily store one or more preview placeholder templates 314 for one or more corresponding types of user interface elements.

Turning back to FIG. 2, if a preview placeholder template is not stored, method 200 includes populating a full version template with data from each of the plurality of parts to render a full version of a representation of the item, as indicated at 206, and generating a preview placeholder template defining an appearance of a thin version of a list item representation, as indicated at 208. This is illustrated in FIG. 3 as the full version template 316 being provided to a preview placeholder template generator 320, which generates the preview placeholder template from the full version template 316. The preview placeholder template generator 320 is also depicted as storing the generated preview placeholder template 314 in cache 312.

The preview placeholder template may be generated in any suitable manner. For example, as indicated at 210 in FIG. 2, the preview placeholder template may be generated by identifying tagged portions of the full version template, such that the preview placeholder template comprises a template that defines the rendered appearance of the subset of the plurality of parts of the full version. The tagged portions may be defined by a developer during development of the full version template (e.g. by including tags in the full version template), and may include any suitable portion or portions of the list items. For example, in some embodiments, the tagged portions may represent metadata considered to be of particular relevance to a user based upon a context in which a user views the thin versions of the list item representations, and/or based upon an amount of computing resources utilized to retrieve and render the portions of full version. As a more specific example, when viewing a long list of albums or songs, a user may not pay attention to information such as genre or year of the media content. Accordingly, it may be more valuable to display an album title or artist than to display a genre or year. As such, the album title and/or artist portions of the full version template may be tagged in the full version template. Likewise, parts such as image-based album art may utilize more computing resources to render than parts such as text-based album titles. As such, album art may not be tagged for inclusion in the thin version in some example embodiments. It will be understood that the term "tag" represents any suitable designation to indicate which portion of the full version template to utilize in forming the preview placeholder template.

Upon generation, the preview placeholder template may be stored for later retrieval, as indicated at 214, so that the preview placeholder template may be used to render thin version of one or more list items in response to a later request to view the list of items. For example, the preview placeholder template may be temporarily stored in a memory cache, as indicated 216. As such, a stored preview placeholder template may be removed or overwritten in storage in response to detecting a change in the full version template. Further, in some examples, the preview placeholder template may be removed from the cache on a more frequent basis. This may help to ensure that the preview placeholder template stays up to date and relevant to list items that are currently being presented. It will be understood that the term "later request for the list of items" refers to a later request for a list of items of that type, rather than the specific items in a list.

If it is determined at 204 that a preview placeholder template is stored for the list of items of the relevant type, the relevant preview placeholder template may be requested and/or retrieved from storage, as indicated at 218, without generation. Upon retrieval or generation, the retrieved preview placeholder template may be populated with data to render a thin version of one or more list items, as indicated at 220. Referring to the example of FIG. 3, in contrast to the full version, which may display information from parts A, B, C, and D, the thin version of the list item may display information from parts A, B, and D and not display information from part C.

Referring back to FIG. 2, method 200 may include rendering the full version of one or more list items after rendering the thin version in order to replace the thin version with a fully rendered representation of an item, as indicated at 222. The thin version may be replaced with the full version based upon any suitable factor(s) and/or events(s). For example, the full version may be rendered and/or presented without delay such that the full version is displayed as soon as it is ready. In another example, the full version may be displayed in response to determining that the item has not been moved off (e.g. scrolled out of view) of a displayable portion of the user interface within a threshold period of time after rendering the thin version of the item. In additional or alternative embodiments, the full version may not be rendered after the thin version based upon any suitable factor(s) and/or event(s). For example, the item may be removed from a displayable portion of the user interface without rendering the full version responsive to determining that the item has been moved off of a displayable portion of the user interface when a scroll speed is greater than a speed threshold.

Figure 4:
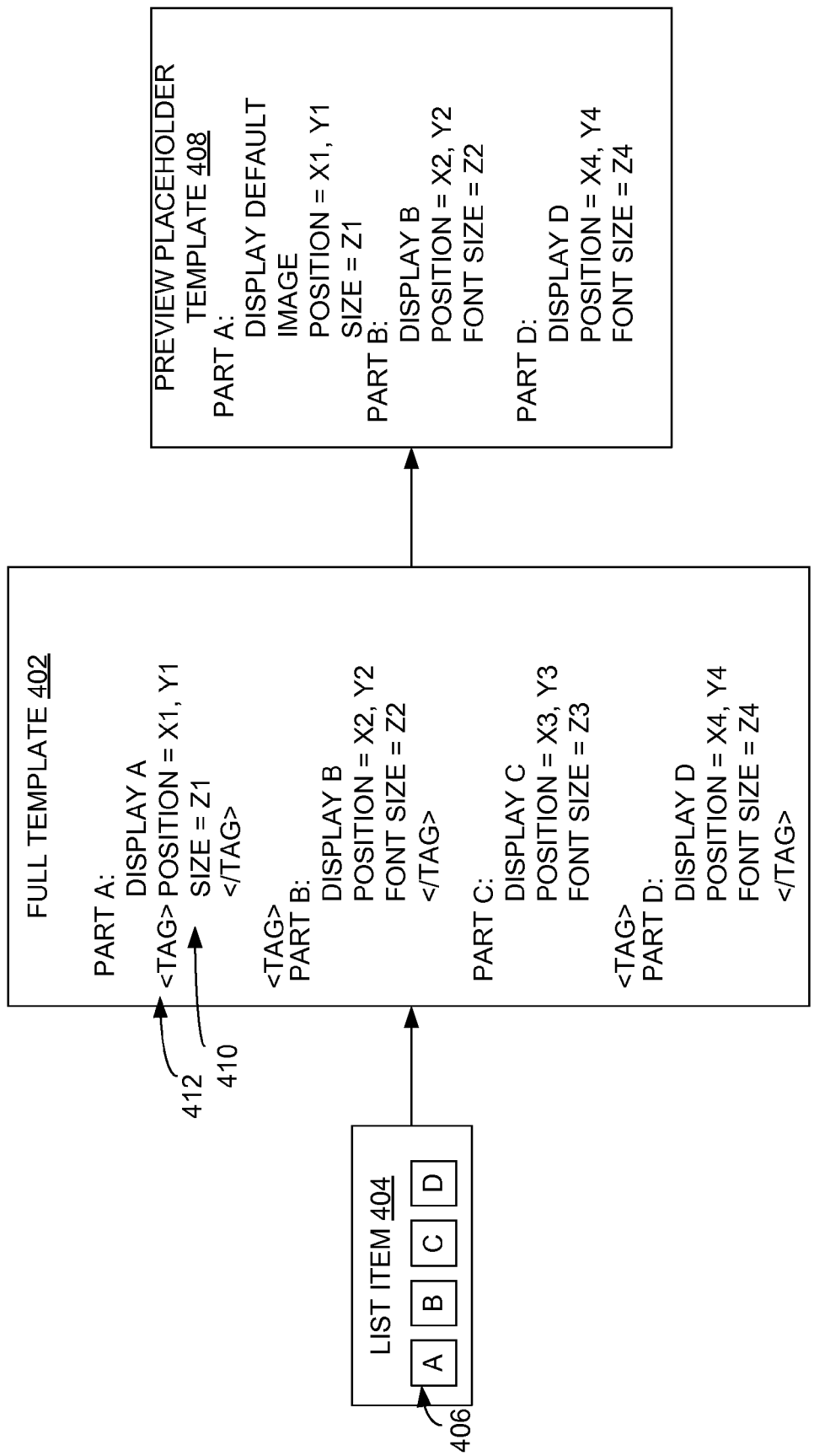
FIG. 4 shows a schematic illustration of an example of a full version template and a preview placeholder template in accordance with an embodiment of the present disclosure.

FIG. 4 shows an example embodiment of a full version template 402 corresponding to a list item 404 including parts 406, shown as parts A, B, C, and D. FIG. 4 also shows an example embodiment of a preview placeholder template 408 generated from the full version template 402. As illustrated, the full version template 402 includes various appearance features 410 that specify an appearance of each part of the list item 404. For example, the full version template 402 specifies, for part A, part A will be displayed in position X1, Y1 with a size of Z1. These appearance features are intended to be illustrative and not limiting. Other examples of appearance features include, but are not limited to, color, font (e.g., typeface, weight, style, size, etc.), size (e.g., width, height, depth), position, and any other feature and/or combination of features may be defined by the full version template.

The full version template 402 further includes one or more tags 412 that identify portions of the full version template designated for inclusion in a dynamically generated preview placeholder template. In the depicted embodiment, the full version template comprises a markup document with tags schematically shown as markup elements. However, it will be understood that the full version template and tags may take any suitable form. In the example of FIG. 4, parts A, B, and D are tagged. Accordingly, in some embodiments, each feature of parts A, B, and D may be in the preview placeholder template 408.

In other embodiments, tags may identify a particular appearance feature or features of a part to be included in a preview placeholder template, instead of all of the features for a selected part. For example, as illustrated in FIG. 4, the position and the size features of part A may be tagged separately from other appearance features of part A, such that a preview placeholder template includes the position of part A but not other appearance features of part A. As the element of part A regarding display of content from "A" is not tagged in the full version template 402, the preview placeholder template 408 is illustrated as directing default content to be displayed for part A in the manner specified by the other elements of part A. The default content may take any suitable form, such as a default image, default text, etc., and may be stored in any suitable location. In other embodiments, a lower resolution version of the content for a selected part may be displayed instead of a default image, text, etc. For example, in the full version, content of part A may include an image having a first, higher resolution, while the thin version may include the image at a second, lower resolution.

Thus, in accordance with the present disclosure, simplified versions of a full version template for a user interface may be dynamically generated. This may help to simplify the maintenance, updating, and debugging associated with storing a separate thin version of the template. Further, the above-described dynamic generation allows the simplified version to automatically incorporate desired appearance details relevant to a particular data item being rendered. Accordingly, a more fluid transition between a thinly rendered data item and a fully rendered data item may be provided, as appearance features are maintained during replacement of the thin version with the full version.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
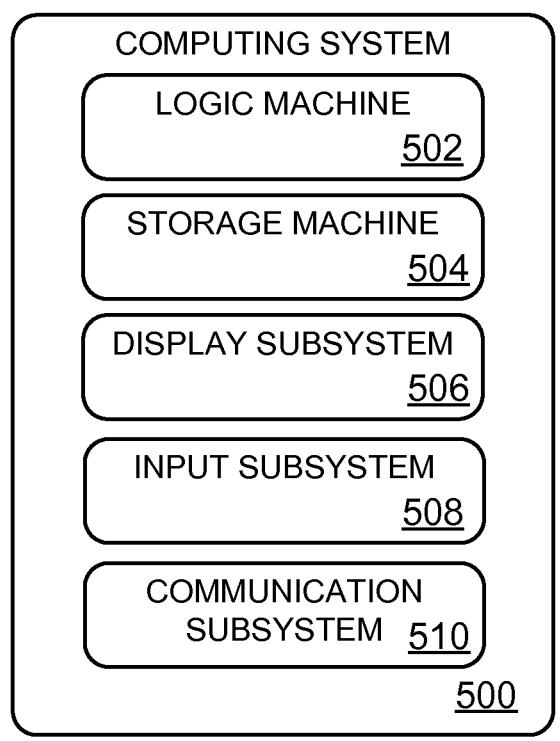
FIG. 5 shows a block diagram of an example computing device in accordance with an embodiment of the present disclosure.

FIG. 5 schematically shows a non-limiting embodiment of a computing system 500 that can enact one or more of the methods and processes described above. Computing system 500 is shown in simplified form. Computing system 500 may take the form of one or more gaming consoles, personal computers, mobile communication devices (e.g., smart phone), mobile computing devices, tablet computers, home-entertainment computers, server computers, control devices, network computing devices, and/or other computing devices. For example, computing system 500 may include computing device 102 of FIG. 1A.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine 504 includes one or more physical devices configured to store and hold instructions (e.g., computer- and/or machine-readable instructions) executable by the logic machine to implement the methods and processes described herein. For example, the logic machine 502 may be in operative communication with a sensor interface and the storage machine 504. When such methods and processes are implemented, the state of the storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include machine-readable volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices. For example, display subsystem 506 may include display device 104 of FIG. 1A.

When included, input subsystem 508 may comprise or interface with one or more user-input devices such as a keyboard, mouse, touch screen, microphone, or game controller. For example, input subsystem may include or interface with computing device 102 of FIG. 1A. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method for presenting a user interface, the method comprising:
    receiving a request to display a list of items, each item of the list of items comprising a plurality of parts each having an appearance defined by a corresponding portion of a full version template;
    for an item in the list of items, populating the full version template with data for each of the plurality of parts to render a full version of a representation of the item;
    generating via the full version template a preview placeholder template defining an appearance of a thin version of a list item representation comprising a subset of the plurality of parts, the preview placeholder template comprising a subset of items of the full version template tagged for inclusion in the preview placeholder template, the subset of items comprising fewer items than the full version template;
    storing the preview placeholder template; and
    in response to a later request for scrolling the list of items, retrieving the preview placeholder template from storage and populating the preview placeholder template with data for the subset of the plurality of parts to render a thin version of one or more items in the list of items initially during scrolling, and then at a later time replacing the thin version of the one or more items in the list of items with the full version of the one or more items in the list of items.

2. The method of claim 1, wherein storing the preview placeholder template further comprises storing the preview placeholder template in a cache memory of the computing device.

3. The method of claim 1, further comprising rendering the full version of each of the one or more items in the list of items the item after rendering the thin version.

4. The method of claim 3, further comprising removing each of the one or more items in the list of items from the user interface without rendering the full version of the item responsive to determining that the thin version of one or more items have been moved off a displayable portion of the user interface.

5. The method of claim 1, wherein the full version comprises an image at a first, higher resolution, and wherein the thin version comprises the image at a second, lower resolution.

6. The method of claim 5, wherein generating the preview placeholder template comprises generating the preview placeholder template from one or more tagged portions of the full version template.

7. The method of claim 1, further comprising determining if the preview placeholder template for the item is stored prior to rendering a full version of the selected first item, and not generating the preview placeholder template if the preview placeholder template is stored.

8. The method of claim 7, further comprising, before populating the full version template, determining if a preview placeholder is stored.

9. A computing device, comprising:
a logic machine; and
a storage machine configured to store instructions executable by the logic machine to
receive a request to display a list of items, each item of the list of items comprising a plurality of parts each having an appearance defined by a corresponding portion of a full version template;
for an item in the list of items, populate the full version template with data for each of the plurality of parts to render a full version of a representation of the item;
generate via the full version template a preview placeholder template defining an appearance of a thin version of a list item representation comprising a subset of the plurality of parts, the preview placeholder template comprising a subset of items of the full version template tagged for inclusion in the preview placeholder template, the subset of items comprising fewer items than the full version template;
store the preview placeholder template; and
in response to a later request for scrolling the list of items, retrieve the preview placeholder template from storage and populate the preview placeholder template with data to render and display a thin version representation of one or more items in the list of items initially during scrolling, and then at a later time replace the thin version of the one or more items in the list of items with the full version of the one or more items in the list of items.

10. The system of claim 9, wherein the user interface comprises a graphical user interface for a media application, the item comprises a media content item, and the plurality of parts comprises a plurality of fields of metadata for the media content item.

11. The system of claim 10, wherein the metadata includes an image having a first, higher resolution, and wherein rendering the thin version comprises presenting the image in a second, lower resolution.

12. The system of claim 10, wherein the full version template specifies at least one appearance feature for each field of the metadata, and the instructions are executable to render the thin version by presenting a default item for a field of the metadata in place of an omitted item from the full representation.

13. The system of claim 9, wherein the instructions are further executable to render the full version of the item after rendering the thin version of the item.

14. The system of claim 13, wherein the instructions are further executable to generate the preview placeholder template from one or more tagged portions of the full version template.

15. The system of claim 9, further comprising a cache memory, wherein storing the preview placeholder template comprises temporarily storing the preview placeholder template in the cache memory.

16. On a computing device, a method for presenting a user interface, the method comprising:
receiving a request to display a list of items, each item of the list of items comprising a plurality of parts each having an appearance defined by a corresponding portion of a full version template comprising a markup document;
for an item in the list of items, populating each portion of the full version template to render a full version of a representation of the item;
identifying one or more tags in the full version template, the one or more tags specifying one or more corresponding portions of the full version template included within a subset of the plurality of parts;
extracting the one or more portions of the full version template specified by the one or more tags to generate a preview placeholder template, the preview placeholder template defining an appearance of a thin version of a list item representation, the preview placeholder template comprising a subset of items of the full version template tagged for inclusion in the preview placeholder template, the subset of items comprising fewer items than the full version template;
storing the preview placeholder template; and
in a later request for scrolling the list of items, retrieving the preview placeholder template from storage and populating the preview placeholder template with data to render and display a thin version of the representation of one or more items of the list of items initially during scrolling, the thin version for each item of the one or more items comprising a default item for a field of metadata in place of an omitted item from the full version, and then at a later time replacing the thin version of the one or more items in the list of items with the full version of the one or more items in the list of items.

17. The method of claim 16, further comprising determining if the preview placeholder template is stored prior to rendering the full version.

18. The method of claim 16, wherein storing the preview placeholder template comprises temporarily storing the preview placeholder in a memory cache of the computing device.

19. The method of claim 16, further comprising, responsive to the later request for displaying the item, rendering the full version after rendering the thin version and replacing the thin version with the full version.

20. The method of claim 16, further comprising removing the preview placeholder template from the storage responsive to detecting a change in the markup document.

* * * * *